United States Patent
Warth et al.

(10) Patent No.: US 7,135,510 B2
(45) Date of Patent: Nov. 14, 2006

(54) THERMOPLASTIC BLENDS WITH IMPROVED LOW-TEMPERATURE TOUGHNESS

(75) Inventors: Holger Warth, Dormagen (DE); Heinrich Alberts, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 287 days.

(21) Appl. No.: 10/033,143

(22) Filed: Oct. 26, 2001

(65) Prior Publication Data

US 2006/0235123 A1    Oct. 19, 2006

(30) Foreign Application Priority Data

Nov. 2, 2000  (DE)  ................ 100 54 274

(51) Int. Cl.
*C08K 5/49* (2006.01)
*C08L 51/04* (2006.01)
*C08L 91/00* (2006.01)
*C08K 5/01* (2006.01)
*C08F 220/44* (2006.01)

(52) U.S. Cl. .............. 524/115; 524/313; 524/481; 524/483; 524/504; 525/329.2; 525/386

(58) Field of Classification Search ............... 524/313, 524/481, 483, 504, 115; 525/329.2, 386
See application file for complete search history.

(56) References Cited

U.S. PATENT DOCUMENTS

| | | | | |
|---|---|---|---|---|
| 5,021,504 A | * | 6/1991 | Fujita et al. ............ | 525/57 |
| 5,352,738 A | | 10/1994 | Hiromoto et al. ............ | 523/70 |
| 5,534,379 A | * | 7/1996 | Dalal et al. ............ | 430/108.8 |
| 6,084,031 A | * | 7/2000 | Medsker et al. ............ | 525/192 |
| 6,111,016 A | * | 8/2000 | Katayama et al. ........ | 525/92 E |
| 6,348,527 B1 | * | 2/2002 | Nodera ................ | 524/127 |

FOREIGN PATENT DOCUMENTS

| | | |
|---|---|---|
| EP | 89182 | 9/1983 |
| EP | 163411 | 12/1985 |
| EP | 244857 | 11/1987 |
| GB | 1509636 | 7/1976 |
| JP | 50-67355 | 6/1975 |
| JP | 50-109247 | 8/1975 |
| JP | 51-41145 | 4/1976 |
| JP | 58-98354 | 6/1983 |
| WO | 91/04296 | 4/1991 |
| WO | 01/23474 | 4/2001 |
| WO | 01/48043 | 7/2001 |
| WO | WO 02/32993 * | 4/2002 |

* cited by examiner

Primary Examiner—Tae H. Yoon
(74) Attorney, Agent, or Firm—Nicanor A. Köhncke

(57) ABSTRACT

A composition containing a graft polymer based on acrylonitrile/ethylene propylene rubber/styrene (AES) and an additive is disclosed. The additive is one which increases the "Δsoft phase" of the composition making it possible to produce moldings with improved toughness at low temperatures, without substantially changing the melt volume rate.

7 Claims, No Drawings

THERMOPLASTIC BLENDS WITH IMPROVED LOW-TEMPERATURE TOUGHNESS

FIELD OF THE INVENTION

The invention relates to thermoplastic molding compositions and more particularly to compositions containing acrylonitrile/ethylene α-olefin rubber/styrene (AES) resin.

SUMMARY OF THE INVENTION

A composition containing a graft polymer based on acrylonitrile/ethylene propylene rubber/styrene (AES) and an additive is disclosed. The additive is one which increases the portion of the soft phase in the composition making it possible to produce moldings with improved toughness at low temperatures, without substantially changing the melt volume rate.

TECHNICAL BACKGROUND OF THE INVENTION

It is known that blends containing AES rubbers and AES resins are weather resistant, but their mechanical properties at low temperatures are unsatisfactory. At temperatures below 0° C. they become brittle and have unsatisfactory toughness which prevents these molding compositions from being used at lower temperatures. In particular the notched impact resistance of AES blends at low temperatures is poor in particular in comparison with acryl/butadiene/styrene (ABS) blends.

EP-A 0 502 367 relates to the production of AES-graft polymers and a copolymer, the copolymer containing 60 to 76 wt. % of an aromatic monomer of the vinyl type and 40 to 24% of an aliphatic copolymer. Vinyl aromatics and/or vinyl aromatics and vinyl cyanides substituted in the ring and/or (meth)acrylic acid-($C_1$–$C_8$)-alkyl esters are grafted on. These thermoplastic copolymers should, amongst other things, have good impact resistance in addition to the desired good gloss, weather-resistance and anti-friction characteristics.

JP-A 50 109 247 discloses polycarbonate blends containing AES, which contain 0.1 to 10 wt. % liquid paraffin. JP-A 58 098 354 discloses polycarbonate blends containing AES and 0.5 to 20 wt. % plasticizers for vinyl polymers. It is not known that the use of special additives, which concentrate specifically in the soft phase of the blend, significantly improves low-temperature properties in polycarbonate AES blends.

The object of the invention is to modify AES blends in such a way that they have improved low-temperature properties, in particular improved notched impact resistance, whilst retaining their weather resistance.

DETAILED DESCRIPTION OF THE INVENTION

This object is achieved by means of a graft polymer composition based on acrylonitrile/ethylene α-olefin rubber/styrene (AES) and selected thermoplastics, such as polycarbonate, polyamide or polyalkylene terephthalate or mixtures thereof, containing an additive, selected from triglycerides, aliphatic saturated and/or unsaturated hydrocarbons and mixtures thereof, characterized in that it concentrates specifically in the soft phase of the blend.

It is known to the person skilled in the art, that the addition of such additives to analogous ABS blends produces no noticeable positive effect.

Surprisingly, it was discovered that the addition of special additives, such as triglycerides and/or special hydrocarbons, to AES blends and blend mixtures containing them, increases the soft phase of the blend, which may be seen from a reduction of the corrected storage modulus G'corr.

Additives which, in addition to increasing the "Δsoft phase" in the blend, also have the smallest effect on the glass transition of the matrix, are particularly suitable. This may be seen in particular from an improvement in the notched impact resistance at low temperatures of the moldings obtained from them. The improved notched impact resistance is accompanied by a significantly reduced rubber-glass transition of the blends. The low temperature properties are improved whilst preserving the essential performance characteristics. It is particularly advantageous and surprising, that the additives according to the invention do not cause the significant increase in the melt volume rate (MVR) of the composition which is observed with known plasticizers. The MVR remains substantially unchanged. Comparison of the MVR of a sample of a composition according to the invention with a sample which differs only in that it does not contain the plasticizer used according to the invention, shows that the MVR of the sample according to the invention differs from a sample without this plasticizer by no more than 9, preferably no more than 6, and most preferably by no more than 3 units. Units according to the invention are whole-number MVR values.

The change in the soft phase, that is "Δsoft phase", is defined according to formulae (IV) and (V) in terms of the ratio of the storage modulus G' at room temperature to the storage modulus G' at −125° C., standardized at the level for ABS (1650 MPa)

$$G'corr. = \frac{G'(23° C.)}{G'(-125° C.)} * 1650 \text{ MPa} \quad (IV)$$

$$\Delta softphase = \frac{G'^{withoutadditive}_{corr.} * 100}{G'^{withoutadditive}_{corr.}} - 100. \quad (V)$$

The additives which are suitable according to the invention include all oils and additives which increase the soft phase of the blends as described above. Triglycerides, aliphatic saturated and/or unsaturated hydrocarbons and mixtures thereof are particularly suitable. Triglycerides to be used according to the invention are preferably those of higher fatty acids having 12 to 35, preferably 14 to 30 carbon atoms. The triglycerides may be vegetable, animal and synthetic fats and oils. Suitable vegetable oils are for example linseed oil, castor oil, rape oil, maize oil and wheatgerm oil.

Suitable aliphatic saturated and/or unsaturated hydrocarbons according to the invention are those with minimum molecular weights of about 400 and mixtures thereof. The hydrocarbons preferably have molecular weights (weight average) of 300 to 50 000, more preferably 500 to 30 000 and in particular 600 to 10 000. Particularly effective oils have a branched structure, short-chain, branched hydrocarbon oils being particularly effective. Polybutenes or polyisobutenes are particularly suitable, in particular if they are characterized by a high content, preferably >50%, in particular >60% in relation to the terminal groups of vinylidene terminal groups.

Low-molecular EPDM oils are also suitable according to the invention. Low-molecular EPDM oils are, in particular, those with weight average molecular weights of 1 000 to 30 000, preferably 5 000 to 10 000 and mixtures thereof. EPDM oils with molecular weights of about 5 600 to 8 800 are preferred in particular.

The additives to be used according to the invention may be used in quantities of 0.1 to about 25 wt. %, for example approximately 1 to 10 wt. %, in relation to the weight of the blends.

The graft polymers used according to the invention are those with EP(D)M rubbers as the grafting base. The glass temperature of such rubbers may be −40 to −60° C., they have only a small number of double bonds, for example less than 20 per 1000 carbon atoms. Examples are copolymers or terpolymers containing at least one ethylene and one α-olefin preferably with only a small number of double bonds, for which see EP-A 163 411 and 244 857. Preferred are those which are produced by polymerization of at least 30 parts by weight ethylene, at least 30 parts by weight α-olefin, preferably in α-position unsaturated aliphatic $C_3$–$C_{20}$-preferably $C_3$–$C_{10}$-hydrocarbon, such as e.g. and particularly preferred propylene, 1-butene, octene, hexene, and optionally 0.5 to 15 parts by weight of an unconjugated di-olefinic component, wherein the sum of the parts by weight add up to 100. Di-olefins having at least five carbon atoms such as 5-ethylidene norbornene, dicyclopentadiene, 2,2,1-dicyclopentadiene and 1,4-hexadiene are generally used as ter-components. Polyalyleneamers such as polypentamer, polyocteneamer, polydodecaneamer or mixtures thereof are also suitable. Finally, partially hydrogenated polybutadiene rubbers, in which at least 70% of the residual double bonds are hydrogenated, may also be used. In general EP(D)M rubbers have a Mooney viscosity $ML_{1-4}$ (100° C.) of 25 to 120. They are obtainable commercially. Polyolefin elastomers or ethene/octene polyolefins analogous to those marketed under the commercial name Engage, may also be used.

Graft polymers of
1) 5 to 95 wt. %, preferably 20 to 80 wt. %, in particular 30 to 50 wt. % of at least one vinyl monomer on
2) 95 to 5 wt. %, preferably 80 to 20, in particular 70 to 20 wt. % of one or more grafting bases, the rubber components of which have glass transition temperatures <0° C., preferably <−20° C., in particular <−40° C., based on EP(D)M rubbers, are preferred in particular.

The grafting base generally has an mean particle size ($d_{50}$-value) of 0.05 to 5 μm, preferably 0.10 to 2 μm, in particular 0.15 to 1 μm.

Monomers referred to in 1) above are preferably mixtures of
1.1) 50 to 99, preferably 60 to 80 parts by weight vinyl aromatics and/or vinyl aromatics substituted in the ring such as styrene, α-methylstyrene, p-methylstyrene, p-chlorostyrene and/or methacrylic acid-($C_1$–$C_8$)-alkyl esters such as methyl methacrylate and ethyl methacrylate and
1.2) 1 to 50, preferably 40 to 20 parts by weight vinyl cyanide (unsaturated nitrites such as acrylonitrile and methacrylonitrile) and/or (meth)acrylic acid-($C_1$–$C_8$)-alkyl esters such as methyl methacrylate, n-butylacrylate, t-butylacrylate, and/or derivatives, such as anhydrides and imides of unsaturated carboxylic acids, for example maleic acid anhydride and N-phenyl maleic imide.

Preferred monomers 1.1 are at least one member selected from the group consisting of styrene, α-methyl styrene and methyl methacrylate, preferred monomers 1.2 are at least one of acrylonitrile, maleic acid anhydride and methyl methacrylate.

The EP(D)M-based graft polymer may be produced, for example, by producing a solution of the EP(D)M elastomer in the monomer mixture and optionally inert solvents and carrying out the grafting reaction at higher temperatures using radical starters such as azo compounds or peroxides. The processes of DE-AS 23 02 014 and DE-A 25 33 991 are mentioned by way of example. It is also possible to work in suspension as in U.S. Pat. No. 4,202,948, incorporated herein by reference or in mass.

The graft polymer compositions according to the invention may contain aromatic polycarbonates and/or aromatic polyester carbonates. These are known from the literature and may be produced by processes known from the literature. For the production of aromatic polyester carbonates see for example Schnell "Chemistry and Physics of Polycarbonates", Interscience Publishers, 1964 and DE-A 1 495 626, DE-A 2 232 877, DE-A 2 703 376, DE-A 2 714 544, DE-A 3 000 610, DE-A 3 832 396; for the production of aromatic polyester carbonates e.g. DE-A 3 077 934) or WO 00/26275.

Aromatic polycarbonates may be produced by reacting diphenols with carbonic acid halogenides, preferably phosgene, and/or with aromatic dicarboxylic acid dihalogenides, preferably benzene dicarboxylic acid dihalogenides, according to the phase interface process, optionally using chain stoppers, for example monophenols and optionally using trifunctional or more than trifunctional branching agents, for example triphenols or tetraphenols.

Diphenols for the production of the aromatic polycarbonates and/or aromatic polyester carbonates are preferably those of the formula (I)

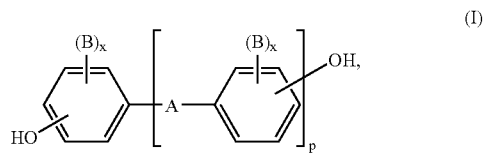

wherein
A is a single bond, $C_1$–$C_5$-alkylene, $C_2$–$C_5$-alkylidene, $C_5$–$C_6$-cyclo-alkylidene, —O—, —SO—, —CO—, —S—, —$SO_2$—, $C_6$–$C_{12}$-arylene, onto which further aromatic rings optionally containing heteroatoms may be condensed,
or a group of the formula (II) or (III)

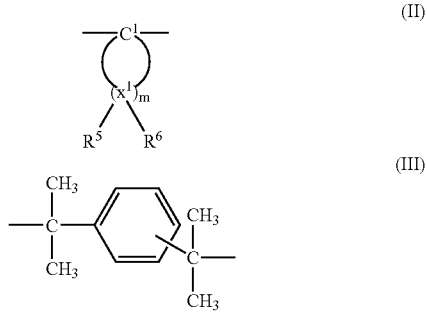

B is, in each case, $C_1$–$C_{12}$-alkyl, preferably methyl, halogen, preferably chlorine and/or bromine
x is, in each case, independently of each other, 0, 1 or 2 p is 1 or 0 and, $R^5$ and $R^6$ is selected individually for each $X^1$, independently of each other, as hydrogen or $C_1$–$C_6$-alkyl, preferably hydrogen, methyl or ethyl, $X^1$ is carbon and m is an integer from 4 to 7, preferably 4 or 5, provided that $R^5$ and $R^6$ are both alkyl on at least one $X^1$ atom.

Preferred diphenols are hydroquinone, resorcinol, dihydroxydiphenols, bis-(hydroxyphenyl)-$C_1$–$C_5$-alkanes, bis-(hydroxyphenyl)-$C_5$–$C_6$-cycloalkanes, bis-(hydroxyphenyl)-ether, bis-(hydroxyphenyl)-sulfoxide, bis-(hydroxyphenyl)-ketones, bis-(hydroxyphenyl)-sulfones and α,α-bis-(hydroxyphenyl)-diisopropyl-benzenes and ring-brominated and/or ring-chlorinated derivatives thereof.

Particularly preferred diphenols are 4,4'-dihydroxydiphenyl, bisphenol-A, 2,4-bis(4-hydroxyphenyl)-2-methylbutane, 1,1-bis-(4-hydroxyphenyl)-cyclohexane, 1,1-bis-(4-hydroxyphenyl)-3,3,5-trimethyl cyclohexane, 4,4'-dihydroxydiphenyl sulfide, 4'4'-dihydroxydiphenyl-sulfone and its di- and tetrabrominated or chlorinated derivatives such as 2,2-bis(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-bis-(4-hydroxyphenyl)-propane (bisphenol A) is preferred in particular.

The diphenols may be used individually or in any mixture. The diphenols are known from the literature or may be obtained by processes known from the literature.

Suitable chain stoppers for the production of thermoplastic, aromatic polycarbonates or polyestercarbonates are for example phenol, p-chlorophenol, p-tert.-butyl phenol or 2,4,6-tribromophenol, but also long chain alkyl phenols such as 4-(1,3-tetramethylbutyl)-phenol according to DE-A 2 842 005 or monoalkylphenol. The quantity of chain stopper is generally 0.5 to 10 mol % in relation to the molar sum of the diphenols used in each case.

The thermoplastic aromatic polycarbonates have weight average molecular weights ($M_w$) of 10 000 to 200 000, preferably 15 000 to 80 000 measured by ultracentrifuge or light-scattering measurement. Mixtures of polycarbonates of differing molecular weights may also be used.

The thermoplastic, aromatic polycarbonates or polyester carbonates may be branched in the known way, and preferably by incorporating 0.05 to 2.0 mol % in relation to the sum of the diphenols used, of trifunctional or more than trifunctional compounds, for example those with three and more phenolic groups. Tri- or polyfunctional carboxylic acid chlorides, such as trimesic acid trichloride, cyanuric acid trichloride or tri- or polyfunctional phenols such as phloroglucin in quantities of 0.01 to 1.0 mol % in relation to the diphenols used may be used as branching agents. Phenolic branching agents may be added with the diphenols, acid chloride branching agents may be introduced with the acid dichlorides.

Both homopolycarbonates and copolycarbonates are suitable. Preferred polycarbonates, in addition to bisphenol-A-homopolycarbonates, are the copolycarbonates of bisphenol-A with up to 15 mol %, in relation to the molar sum of diphenols, of other preferred or particularly preferred diphenols, in particular 2,2-bis(3,5-dibromo-4-hydroxyphenyl)-propane.

Preferred aromatic dicarboxylic acid dihalogenides for the production of aromatic polyester carbonates are the diacid dichlorides of isophthalic acid, terephthalic acid, diphenylether-4,4'-dicarboxylic acid and naphthaline-2,6-dicarboxylic acid.

Mixtures of diacid dichlorides of isophthalic acid and terephthalic acid in a ratio of 1:20 to 20:1 are preferred in particular.

When producing polyester carbonates, an additional carbonic acid halogenide, preferably phosgene, is used as a bifunctional acid derivative.

The aromatic polyester carbonates may also contain incorporated aromatic hydroxycarboxylic acids.

The proportion of carbonate structural units in the thermoplastic aromatic polyester carbonates may be varied at will. The portion of carbonate groups is preferably up to 100 mol %, in particular up to 80 mol % and most preferably up to 50 mol % in relation to the sum of ester groups and carbonate groups. Both the ester and the carbonate portion of the aromatic polyester carbonates may be present in the form of blocks or randomly distributed in the polycondensate.

The relative solution viscosity ($\eta_{rel}$) of the aromatic polycarbonates and polyester-carbonates is in the range 1.18 to 1.4, preferably 1.20 to 1.32, measured on solutions of 0.5 g polycarbonate or polyestercarbonate in 100 ml methylene chloride solution at 25° C.

The thermoplastic, aromatic polycarbonates and polyester carbonates may be used alone or in any mixture.

The blend compositions according to the invention may also contain polyalkyleneterephthalates as disclosed for example in WO 0 029 476. Polyethylene- or polybutyleneterephthalates or mixtures thereof are preferred. The blend compositions may also contain vinyl-(co)polymers, in particular (co)polymers based on styrene and acrylonitrile, as disclosed in EP-A 640 655.

The blend compositions according to the invention may also contain other known additives for blends and aromatic polycarbonates such as at least one of the conventional additives, such as lubricants and mold-release agents, for example pentaerythrite tetrastearate, nucleating agents, flame retardants, antistatic agents, stabilizers, fillers and reinforcing agents, and dyes and pigments as well as electrically conductive additives e.g. polyaniline or nanotubes.

Flame retardants containing phosphorus according to the invention are selected in particular from the groups of mono- and oligomeric phosphoric- and phosphonic acid esters, phosphonate amines, and phosphazines, and mixtures of several components selected from one or more of these groups may be used as a flame retardant. Other halogen-free phosphorus compounds not specifically mentioned here may also be used alone or in any combination with other halogen-free phosphorus compounds.

The filled or reinforced molding compositions may contain up to 60 wt. %, preferably 5 to 40 wt. % in relation to the filled or reinforced molding composition of fillers and/or reinforcing materials. Preferred reinforcing materials are glass fibers. Preferred fillers, which may also have a reinforcing action, are glass beads, mica, silicates, quartz, talc, titanium dioxide, wollastonite.

The molding compositions according to the invention may contain up to 35 wt. % in relation to the composition of another flame retardant, optionally with a synergistic action. Examples of other flame retardants are organic halogen compounds such as decabromobisphenyl ether, tetrabromobisphenol, inorganic halogen compounds such as ammonium bromide, nitrogen compounds such as melamine.

The compositions according to the invention may be produced by mixing the components in the known way and melt compounding or melt extruding them at raised temperatures, preferably at 200 to 350° C. in the conventional devices such as internal kneaders, extruders and double screw extruders. The individual components may be added to the mixture one after the other or at the same time. The moldings according to the invention may be produced by extrusion or injection molding.

The moldings according to the invention are suitable for example for external use e.g. in window parts, air-conditioning systems, water tanks, external car components, garden tools, housings for domestic appliances such as juicers, coffee machines, food mixers, for office equipment such as monitors, printers, copiers or covers for the building industry and for motor vehicle parts. They may also be used for electro-technical applications, as they have very good electrical properties. The molding compositions according to the invention are also suitable for the production of moldings by deep-drawing from previously produced sheets or films.

Other possible applications are

In data systems: telecommunication devices such as telephones and fax machines, computers, printers, scanners, plotters, monitors, keyboards, typewriters, Dictaphones, etc., In electrical devices: power unit components, chargers, small transformers for computers and entertainment systems, low-voltage transformers etc., In garden tools: garden furniture, lawnmower housings, pipes and housings for garden irrigation systems, garden sheds, garden vacuums, shredders, straw cutters, sprinklers etc., In furniture: work surfaces, furnishing laminates, shutter elements, office furniture, tables, chairs, armchairs, cupboards, shelving units, door elements, window elements, linen drawers etc., In sports equipment/toys: toy vehicles, seats, pedals, sports equipment, bicycles, table tennis tables, home exercise machines, golf caddies, snow boards, external boat components, camping equipment, beach chairs, etc.,.

Internal/external applications in the building industry: cladding, beading, pipes, cables, shutter elements, letter boxes, light fittings, roof tiles, interior tiles, partitions, cable ducts, skirting boards, plug sockets etc., In motor vehicles/rail vehicles: wall and floor coverings, seat shells, seats, benches, tables, luggage racks, hub caps, rear spoilers, mud flaps, tail gates, bonnets, side panels etc.

The following examples serve to explain the invention further.

EXAMPLES

Polycarbonate/AES or polyamide/AES blends of the following composition are produced as a base material for testing:
PC/AES blends (base material A)
57 parts by weight polycarbonate
25 parts by weight SAN-1
18 parts by weight AES blend (Blendex® WX 270 Ube Cycon Ltd, Tokyo, Japan or Royaltuf® 372, Uniroyal, GB or AES 665, Techno Polymers, Tokyo, Japan)
0.9 parts by weight conventional additives such as e.g. mold release agents, antioxidants.
PA/AES blends (base material B)
44 parts by weight polyamide (Durethan B29, Bayer AG)
23 parts by weight SAN-2
27 parts by weight AES-Blend (Blendex® WX 270 Ube Cycon Ltd, Tokyo, Japan or Royaltuf® 372, Uniroyal, GB or AES 665, Techno Polymers, Tokyo, Japan)
7.5 parts by weight conventional additives such as e.g. mold release agents, antioxidants, compatibility agents.

Polycarbonate:

Linear polycarbonate based on bisphenol A with a relative solution viscosity of 1.272 measured in the solvent $CH_2Cl_2$ at 25° C. and at a concentration of 0.5 g/100 ml.

SAN-1:

Styrene/acrylonitrile copolymer with a styrene/acrylonitrile weight ratio of 72:28 and an intrinsic viscosity of 0.55 dl/g (measured in dimethylformamide at 20° C.).

SAN-2:

Styrene/acrylonitrile copolymer with a styrene/acrylonitrile weight ratio of 72:28 and an intrinsic viscosity of 0.75 dl g (measured in dimethylformamide at 20° C.).

Talc: Naintsch A3, talc of Naintsch Mineralwerke GmbH, Germany, $d_{50}$=1,2 µm.

Samples of base material A or B are added to 1, 5 or 10 parts by weight maize oil, 5 parts by weight Napvis® D2, D5 or D07 (BP Amoco Chemicals, Lavera, France) and 5 parts by weight poly R® 10 (Pitco Industrigs N.V., Netherlands).

A PC/AES or PA/AES blend without a corresponding additive and PC/AES blends with additives of 5 parts by weight Admoll® D0 and 5 parts by weight Oppanole B200 (both BASF AG, Ludwigshafen, Germany) are used for comparison.

The components are mixed in a 3 l internal kneader. The moldings are produced in an Arburg 270 E injection moldingmachine at 260° C.

The notched impact resistance at 23° C. and at low temperatures, including the rubber-glass transition (steep drop) and the melt-volume-rate are tested on moldings of the materials obtained. In order to test the effect of the additive on the soft phase volume the storage modulus G' is determined by dynamic-mechanical analysis by using a method known to the person skilled in the art. A measure of the change in the soft phase may be defined from the ratio of the storage modulus at room temperature to the storage modulus at −125° C. standardized at the level for ABS (1650 Mpa) according to Formulae (IV) and (V):

$$G'corr. = \frac{G'(23° C.)}{G'(-125° C.)} * 1650 \text{ MPa} \quad (IV)$$

$$\Delta softphase = \frac{G'^{withoutadditive}_{corr.} *}{G'^{withoutadditive}_{corr.}} - 100 \quad (V)$$

The notched impact resistance $a_k$ is determined according to ISO 180/1A. The critical temperature, the temperature below which brittle fracture behavior occurs instead of tough fracture behavior, is determined accordingly. The melt-volume rate gives the volume of the blend which flows through a nozzle of a given size in ten minutes at a certain temperature and flow rate. The melt-volume rate (MVR) is determined according to ISO 1133 at 260° C. with an application weight of 5 kg.

The test results are given in tables 1, 2, 3 and 4. These results show a clear drop in the critical temperature (rubber-glass transition), without impairing the mechanical properties such as notched impact resistance. The increase in soft phase volumes also correlates well with the shift of the steep drop to low temperatures. It is noticeable that with the additives according to the invention, there is no clear increase in the MVR such as would be seen for the plasticizers known from the prior art.

The examples in tables 1 to 3 and 5 contain base material A, the examples in table 4 contain base material B.

TABLE 1

|  | Comparison 1 (18 parts by wt. WX270) | Comparison 2 (18 parts by wt. Royaltuf ® 372) | Example 1 1 part by wt. Maize oil (18 parts by wt. Royaltuf ® 372) | Example 2 5 parts by wt. Maize oil (18 parts by wt. Royaltuf ® 372) | Example 3 5 parts by wt. Maize oil (18 parts by wt. WX270) | Example 4 10 parts by wt. Maize oil (18 parts by wt. Royaltuf ® 372) | Example 5 10 parts by wt. Maize oil (18 parts by weight WX270) |
|---|---|---|---|---|---|---|---|
| $a_k$ Izod 23° C. [kJ/m$^2$] | 47 | 44 | 48 | 41 | 84 | 42 | 47 |
| Rubber-glass transition | −15 | −5 | −5 | −25 | −25 | −25 | −50 |
| MVR 260° C./5 kg [ml/10 min] | 10 | 8 | 12 | 16 | 12 | 22 | 13 |
| Δsoft phase | 0 | 0 | +1% | +1% | +2% | +0.5% | +6.9% |

In Tables 2 and 3 all tests are carried out with 18 parts by weight WX270

TABLE 2

|  | Comparison 3 without additives | Example 6 5 parts by wt. NAPVIS ® D2 | Example 7 5 parts by wt. NAPVIS ® D5 | Example 8 5 parts by wt, NAPVIS ® D07 | Example 9 5 parts by wt. Polu ® 10 | Comparison 4 5 parts by wt. Admoll D0 | Comparison 5 Reference 35 parts by wt. Oppanol B200 |
|---|---|---|---|---|---|---|---|
| $a_k$ Izod 23° C. [kJ/m$^2$] | 47 | 96 | 87 | 84 | 64 | 40 | 45 |
| Rubber-glass transition | −15 | −15 | −25 | −25 | −25 | −10 | +10 |
| MVR 260° C./5 kg [ml/10 min] | 10 | 10 | 10 | 11 | 8 | 23 | 9 |
| Δsoft phase | 0 | −7% | +3% | +3% | +28.4% | −12% | −20% |

TABLE 3

|  | Comparison 1 (18 parts by wt. WX270) | Example 10 5 parts by wt. Trilene ® 67 (18 parts by wt. WX270) | Example 11 5 parts by wt. Trilene ® CP80 (18 parts by wt. WX270) | Example 12 5 parts by wt. Trilene 67 (18 parts by wt. Royaltuf 372) | Example 13 5 parts by wt. Trilene CP68 (18 parts by wt. Royaltuf 372) |
|---|---|---|---|---|---|
| $a_k$ Izod 23° C. [kJ/m$^2$] | 47 | 65 | 68 | 51 | 57 |
| Rubber-glass transition | −15 | −15 | −15 | −25 | −25 |
| MVR 260° C./5 kg [ml/10 min] | 10 | 11 | 12 | 11 | 14 |
| Δsoft phase | 0 | +8% | +9% | +20% | +19% |

TABLE 4

| PA/AES |  |  |  |
|---|---|---|---|
|  | Comparison 6 (without additive) | Example 14 5 parts by wt. Poly 10 | Example 15 5 parts by wt. maize oil |
| $a_k$ Izod 23° C. [kJ/m$^2$] | 65 | 73 | 73 |
| Rubber-glass transition | −10 | −25 | −25 |
| MVR 260° C./5 kg [ml/10 min] | 4.3 | 3.1 | 3.9 |
| Δsoft phase | 0 | +18% | +11% |

TABLE 5

|  | Comparison 6 (18 parts by wt. WX270 8 parts by wt. talc) | Example 16 (5 parts by wt. Poly ® 10 8 parts by wt. talc) |
|---|---|---|
| $a_k$ Izod 23° C. [kJ/m$^2$] | 45 | 64 |
| Rubber-glass transition | +5 | −5 |
| MVR 260° C./ 5 kg [ml/10 min] | 6 | 7 |
| Δsoft phase | 0 | +21 |

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition containing an acrylonitrile/ethylene α-olefine rubber/styrene graft polymer and an amount of polybutenes and polyisobutenes having a weight average molecular weight of 600 to 10000 sufficient to increase the "Δsoft phase" value of the composition; and containing at least one member selected from the group consisting of polycarbonate, polyamide, polyalkylene terephthalate and copolymers of vinyl aromatic monomers.

2. The composition according to claim 1 having a melt volume rate that differs by no more than nine units from a corresponding composition that contains no additive compound.

3. The composition according to claim 1, wherein the copolymer of vinyl aromatic monomers are 50 to 99 parts by weight polymerized vinyl aromatic monomers and/or polymerized vinyl aromatic monomers substituted in the ring and 1 to 50 part by weight of vinyl cyanide monomers and/or (meth)acrylic acid ($C_1$–$C_8$) alkylester monomers and/or anhydride monomers and/or imide of unsaturated carboxylic acid monomers.

4. The composition of claim 1 further containing a flame retardant agent.

5. The composition according to claim 4 wherein flame retarding agent is a phosphorous compound.

6. A molded article comprising the composition according to claim 1.

7. The molded article according to claim 6 further containing a mineral filler.

* * * * *